United States Patent [19]

Chauvel

[11] 4,390,597
[45] Jun. 28, 1983

[54] INTERPOLYMER LATEX AND PROCESS FOR THE PREPARATION THEREOF

[75] Inventor: Bernard Chauvel, Ermont, France

[73] Assignee: Rhone-Poulenc Industries, Courbevoie, France

[21] Appl. No.: 320,302

[22] Filed: Nov. 12, 1981

[30] Foreign Application Priority Data

Nov. 19, 1980 [FR] France .................. 80 24516

[51] Int. Cl.³ .................................... B32B 23/08
[52] U.S. Cl. .................................. 428/512; 524/534; 524/535; 525/287; 526/317
[58] Field of Search ............... 524/534, 535; 525/287; 526/317; 428/512

[56] References Cited

U.S. PATENT DOCUMENTS

| 3,083,118 | 3/1963 | Bridgeford | 525/287 |
| 3,255,276 | 6/1966 | Winter et al. | 260/897 |
| 3,346,531 | 10/1967 | Roorey et al. | 526/317 |
| 3,399,080 | 8/1968 | Vitkuske | 526/317 |
| 3,849,358 | 11/1974 | Inoue et al. | 524/535 |

FOREIGN PATENT DOCUMENTS 173407  7/1965  U.S.S.R. .

*Primary Examiner*—Joseph L. Schofer
*Assistant Examiner*—N. Sarafin
*Attorney, Agent, or Firm*—McDougall, Hersh & Scott

[57] ABSTRACT

Interpolymer latex and process for the preparation thereof, in which the latexes are aqueous dispersions of particles having a diameter which is essentially between 0.1 and 1 μm of an interpolymer comprising a copolymer A of butadiene, styrene and at least one ethylenic unsaturated carboxylic acid and a polymer B of bis(2-chloroethyl)vinylphosphonate which is at least partly grafted onto copolymer A. They can be used in particular as binders, more particularly in the paper coating industry and in the textile industry.

13 Claims, No Drawings

INTERPOLYMER LATEX AND PROCESS FOR THE PREPARATION THEREOF

The present invention concerns interpolymer latexes which can be used in particular as binders. It also concerns a process for preparing said latexes.

U.S. Pat. No. 3,255,276 describes an interpolymer comprising a copolymer of butadiene and styrene and a polymer of vinylphosphonic acid or the alkyl hemiester of that acid, which polymer is at least partly grafted onto the butadiene and styrene copolymer. However, these interpolymers, when used as a binder in aqueous compositions for coating paper, do not impart adequate wet tearing strength to the coated papers, although that is necessary for papers which are used in particular in offset printing.

The aim of the present invention is to overcome that disadvantage while making it possible to produce an interpolymer in the form of a latex having enhanced binding properties, and which is highly suitable for coating paper to which it imparts a highly satisfactory degree of wet tearing strength (wet IGT).

The latexes according to the invention are aqueous dispersions of particles of a diameter which is essentially between 0.1 and 1 μm of an interpolymer comprising a copolymer A of butadiene, styrene and at least one ethylenic unsaturated carboxylic acid and a polymer B of bis(2-chloroethyl)vinylphosphonate which is at least partly grafted onto copolymer A.

Preferably, the interpolymer comprises from 80 to 99% by weight of copolymer A and from 20 to 1% by weight of polymer B.

Also preferably, the copolymer A comprises by weight from 25 to 55% of butadiene, from 35 to 74% of styrene and from 1 to 10% of at least one ethylenic unsaturated carboxylic acid.

Also preferably, the polymer B comprises by weight from 15 to 100% of bis(2-chloroethyl)vinylphosphonate and from 0 to 85% of at least one ethylenic unsaturated compound copolymerizable with bis(2-chloroethyl)-vinylphosphonate.

Also preferably, the part of the interpolymer which is insoluble in isopropyl alcohol represents at least 75% of the interpolymer and comprises, in the grafted condition, from 0.2 to 15% by weight of bis(2-chloroethyl)-vinylphosphonate.

The proportion by weight of dry materials in the latexes according to the present invention is generally from 1 to 70% and preferably from 30 to 55%.

Examples of ethylenic unsaturated carboxylic acids involved in the composition of copolymer A include in particular acrylic acid, methacrylic acid, itaconic acid, maleic acid and fumaric acid.

Examples of compounds which are copolymerizable with bis(2-chloroethyl)vinylphosphonate include in particular aromatic compounds, vinyl halides, vinylidene halides, dienic compounds, vinyl esters of carboxylic acid and acrylic compounds. The following may be more particularly mentioned: styrene, α-methylstyrene, paratertiobutylstyrene, chlorostyrene, vinyl toluene, vinyl chloride, vinyl bromide, vinyl fluoride, vinylidene chloride, butadiene, isoprene, chloroprene, acrylic acid, methacrylic acid, acrylamide, methacrylamide, acrylic nitrile, methacrylic nitrile, chloroacrylonitrile, vinyl acetate, esters of acrylic acid such as methyl acrylate, ethyl acrylate, hydroxyethyl acrylate, hydroxypropyl acrylate, n-butyl acrylate, isobutyl acrylate, and esters of methacrylic acid such as methyl methacrylate, ethyl methacrylate, hydroxyethyl methacrylate, hydroxypropyl methacrylate, n-butyl methacrylate and isobutyl methacrylate.

The process for producing the latexes according to the present invention comprises preparing a latex of copolymer A by emulsion polymerization of butadiene, styrene and at least one ethylenic unsaturated carboxylic acid, followed by polymerization in the presence of the latex of copolymer A, of bis(2-chloroethyl)vinylphosphonate and optionally at least one ethylenic unsaturated compound copolymerizable with bis(2-chloroethyl)vinylphosphonate.

The latex of copolymer A is prepared in per se known manner by polymerization in aqueous emulsion of butadiene, styrene and at least one ethylenic unsaturated carboxylic acid, in the presence of at least one initiating agent and at least one emulsifying agent, with a level of concentration of the mixture of monomers in the reaction medium generally being between 20 and 60% by weight.

The butadiene generally represents from 15 to 85% and preferably from 25 to 55% by weight of the total of monomers to be polymerized.

The styrene generally represents from 5 to 84% and preferably from 35 to 74% by weight of the total of monomers to be polymerized.

The amount of carboxylic acid used is generally from 1 to 10% by weight with respect to the total of monomers to be polymerized.

The monomers used can be introduced into the reaction medium in the form of a mixture or separately and simultaneously, either before the beginning of polymerization in one batch or in the course of polymerization in successive fractions or continuously.

The emulsifying agent used is conventional anionic agents represented in particular by fatty acid salts, alkylsulphates, alkylsulphonates, arylsulphates, arylsulphonates, alkylarylsulphates, alkylarylsulphonates, sulphosuccinates, alkali metal alkylphosphates, and hydrogenated or unhydrogenated abietic acid salts. They are used in an amount of from 0.01 to 5% by weight with respect to the total of monomers.

The initiating agent which is water-soluble is represented more particularly by hydroperoxides such as hydrogen peroxide, cumene hydroperoxide, diisopropylbenzene hydroperoxide, and paramenthane hydroperoxide, and by persulphates such as sodium persulphate, potassium persulphate and ammonium persulphate. It is used in amounts of from 0.05 to 2% by weight with respect to the total of monomers. The initiating agents are possibly associated with a reducing agent such as for example sodium formaldehydesulphoxylate or bisulphite, polyethyleneamines, the sugars: dextrose and sucrose, and metal salts. The amounts of reducing agent used vary from 0 to 3% by weight with respect to the total of monomers.

The reaction temperature which depends on the initiating agent used is generally from 0° to 110° C. and preferably from 25° to 90° C.

Polymerization of the bis(2-chloroethyl)vinylphosphonate and possibly a compound copolymerizable with bis(2-chloroethyl)vinylphosphonate, in the presence of copolymer A, is effected in aqueous emulsion in the presence or the absence of an emulsifying agent, a polymerization initiating agent and possibly a transfer agent with a concentration in respect of the total of copolymer A+monomer(s) in the reaction medium of from 20 to 70% by weight.

The amount of latex of copolymer A used is such that copolymer A generally represents from 80 to 99% by weight of the total of copolymer A+monomer(s).

The initiating agent which is identical to or different from that used for preparation of copolymer A is selected from the above-mentioned initiating agents. It is used in amounts of from 0.05 to 6% by weight with respect to the monomer or monomers.

The emulsifying agent which is present in the copolymer A latex is generally sufficient to maintain the stability of the emulsion in the course of the polymerization operation. However, in some cases, it may be useful to add an additional amount of emulsifying agent which is identical to or different from that used for the preparation of copolymer A. This emulsifying agent is selected from the above-indicated list and is introduced in a proportion of from 0 to 2.5% by weight with respect to the total of copolymer A+monomer or monomers.

The transfer agent which is used in proportions ranging from 0 to 3% by weight with respect to the monomer or monomers is generally selected from mercaptans such as N-dodecylmercaptan, tertiododecylmercaptan; cyclohexene; and halogenated hydrocarbons such as chloroform, bromoform and carbon tetrachloride. It makes it possible to control the proportion of polymer grafted and the length of the grafted molecular chains. It is added to the reaction medium either before polymerization or in the course of polymerization.

The reaction temperature which depends on the monomer which is copolymerizable with bis(2-chloroethyl)-vinylphosphonate and the initiating agent used is generally from 0° to 110° C. and preferably from 25° to 90° C.

The latexes according to the invention can be used in particular as binding agents for the preparation of aqueous compositions for coating paper and more particularly paper for offset printing.

It is known that aqueous compositions for coating paper contain in principle pigments and binding agents. The pigment which is most generally used is mineral clay. It is also possible to use other pigments such as calcium carbonate, titanium oxide, satin white, hydrargillite, talcum and barium sulphate. The pigments are made into a dispersion in water, generally in an alkaline medium and in the presence of dispersing agents, the most important of which are tetrasodium pyrophosphate, sodium hexametaphosphate and polyacrylates of low molecular weight, in proportions of from 0.2 to 0.5% by weight with respect to the pigments. The pigments are fixed to the paper by way of binding agents. It has already been proposed that suitable binding agents for this use include aqueous latexes of a synthetic polymer such as a copolymer of butadiene and styrene, a carboxylated copolymer of butadiene and styrene, an acrylic polymer or a vinyl acetate polymer, which are used either alone or in mixture with natural binding agents such as starches, proteins or casein, or synthetic binding agents such as polyvinyl alcohols. One category of synthetic binding agents which is a particularly attractive proposition comprises latexes of carboxylated copolymers of butadiene and styrene containing, by weight, from 30 to 50% of butadiene, from 40 to 68% of styrene and from 2 to 10% of at least one ethylenic unsaturated carboxylic acid. It is also possible for the latexes to have associated therewith, substances which are capable of improving the water retention properties of the coating compositions, such as carboxymethylcelluloses or alginates.

Finally, the coating compositions may contain various other ingredients such as in particular crosslinking agents, anti-foam agents, slip agents and optical brightening agents.

The operation of coating paper by means of the aqueous compositions is performed by means of a coating machine using various methods employing various apparatuses, including those which are known industrially by the following names: the air blade, the size press, the Champion coating apparatus, the Massey coating apparatus and the trailing scraper or doctor apparatus. After the coating operation, the paper is subjected to a drying operation, generally followed by a calendering operation.

Of the properties that must be enjoyed by the coated paper for use in offset printing, wet tearing strength is a particularly important one. The offset printing process which is based on the repulsion of water by greasy inks actually uses water. In quadrichromic offset printing, it is consequently necessary for the second, third or fourth color to be printed at a location which has been previously wetted. Therefore, in order to avoid tearing phenomena in the wet state, which results in fouling of the blanket and the offset presses, it is important for the paper to have a sufficient level of wet tearing strength.

The latexes according to the invention provide a coated paper which has a higher degree of wet tearing strength than the latexes of the corresponding copolymers A.

The latexes according to the invention can also be used as a binding agent in the textile industry, in particular for the production of non-woven fabric.

Following Examples 1 to 11 wherein the parts are given by weight are intended to illustrate the invention.

EXAMPLES 1 TO 11

Preparation of Copolymer A

The number of parts of butadiene and styrene which are indicated in Table 1 in respect of each Example is introduced into a stainless steel autoclave provided with an agitator.

TABLE 1

|  | Example 1 | Example 2 | Examples 3 to 9 | Examples 10 to 11 |
|---|---|---|---|---|
| Butadiene | 27 | 40 | 32 | 50 |
| Styrene | 69 | 56 | 53 | 46 |

The following are also introduced:
100 parts of deionized water
2 parts of acrylic acid
2 parts of itaconic acid
0.5 part of sodium laurylsulphate, and
0.8 part of ammonium persulphate The reaction mixture is heated to 75° C. and maintained at that temperature for the duration of the reaction. After 10 hours of reaction, the conversion rate is of the order of 98%. The unreacted butadiene is degassed. The particles of the latex produced are approximately 0.15 μm in diameter and are of a composition which is substantially equivalent to that of the substances used.

Polymerization in the Presence of Copolymer A

The number of parts of copolymer A (in the form of the corresponding latex as prepared hereinbefore), bis(2-chloroethyl)vinylphosphonate and possibly methyl methacrylate as indicated in Table 2 in respect of each Example is introduced into a stainless steel autoclave provided with an agitator.

TABLE 2

| Example | Copolymer A | Bis (2-chloroethyl) vinylphosphonate | Methyl methacrylate | Ammonium persulphate |
|---------|-------------|--------------------------------------|---------------------|----------------------|
| 1 | 97 | 3 | — | 0.12 |
| 2 | 95 | 5 | — | 0.20 |
| 3 | 98 | 2 | — | 0.08 |
| 4 | 97 | 3 | — | 0.12 |
| 5 | 96 | 4 | — | 0.16 |
| 6 | 95 | 5 | — | 0.20 |
| 7 | 90 | 10 | — | 0.40 |
| 8 | 90 | 4 | 6 | 0.40 |
| 9 | 90 | 5.5 | 4.5 | 0.40 |
| 10 | 95 | 5 | — | 0.20 |
| 11 | 88 | 5.4 | 6.6 | 0.48 |

One part of sodium hydroxide is also introduced.

The temperature of the reaction medium is raised to 75° C. and the number of parts set forth in Table 2 of ammonium persulphate dissolved in 10 parts of deionised water is introduced into the autoclave. The above-indicated temperature is maintained for 4 hours, and the temperature is then raised to 85° C. and maintained for 3 hours, followed by cooling to ambient temperature. The result is an interpolymer latex according to the invention.

Table 3 hereinafter indicates in respect of each example the content by weight of dry materials in the interpolymer latex, the proportion of interpolymer which is insoluble in isopropyl alcohol and the proportion by weight of bis(2-chloroethyl)vinylphosphonate, which is present in the grafted state, in the part of the interpolymer which is insoluble in isopropyl alcohol.

TABLE 3

| Example | Content by weight of dry materials in the interpolymer latex (%) | Proportion of interpolymer which is insoluble in isopropyl alcohol (%) | Proportion by weight of bis(2-chloroethyl)vinyl-phosphonate, present in the grafted state, in the part of the interpolymer insoluble in isopropyl alcohol (%) |
|---------|---|---|---|
| 1 | 47.3 | 92.1 | 1.1 |
| 2 | 47.8 | 90.1 | 4.4 |
| 3 | 47.2 | 96.4 | 1.8 |
| 4 | 47.5 | 94.2 | 2.1 |
| 5 | 47.7 | 92.9 | 2.3 |
| 6 | 47.8 | 94.9 | 3.9 |
| 7 | 49.3 | 92.6 | 7.5 |
| 8 | 49.3 | 89 | 3.5 |
| 9 | 49.1 | 87 | 3.7 |
| 10 | 47.8 | 93.2 | 3.5 |
| 11 | 49.6 | 92.3 | 3.6 |

The proportion of interpolymer which is insoluble in isopropyl alcohol is determined by means of the following method:

Taking the latex to be examined, a film which is 15/100 mm in thickness (as measured in the wet state) is prepared on a glass plate. The film is dried for 2 hours at ambient temperature and then for 2 hours in a drying oven at 50° C. A sample of interpolymer whose weight Po is close to 200 mg is taken from the film and placed in a small bag produced from a filter paper. The bag containing the interpolymer is suspended for 7 hours in isopropyl alcohol which is heated under reflux. After draining of the bag and drying it on dry filter paper, and removing the isopropyl alcohol by the sample of interpolymer being left in the drying oven at a temperature of 110° C. for 15 hours, the weight P of the sample is determined. The proportion of interpolymer which is insoluble in isopropyl alcohol is given by the ratio P/Po expressed as a percentage.

The proportion by weight of bis(2-chloroethyl)vinylphosphonate, which is present in the grafted state, in the part of the interpolymer which is insoluble in isopropyl alcohol, is determined by quantitative analysis, using elementary analysis methods, of the phosphorus contained in said part of the interpolymer.

Aqueous coating compositions are prepared, and a layer of 20 g/m², expressed in respect of dry materials, of each of said compositions, is applied to a paper by means of an air blade coating apparatus. A 60 g/m² paper is used. The paper after coating in this manner is dried in a tunnel furnace at a temperature of 120° C. and then subjected to a calendering operation, comprising four successive passes between two cylinders under a force of 80 kN per meter.

After drying and calendering, the coated paper is conditioned at a temperature of 23° C. in an atmosphere containing 50% relative humidity, and then examined from the point of view of wet tearing strength. Wet tearing strength is determined by means of the IGT apparatus developed by the "Institut von Grafische Technik", wherein a sample of coated paper on which a thin film of water has first been deposited is brought into contact with an inking roller, the pressure of which against the sample is adjusted to a selected value; the speed of printing is increased until incipient tearing of the applied coating is observed. Wet tearing strength is determined visually by comparison with other samples. "3801" ink which is marketed by Etablissements Lorilleux Lefranc is used. The results are expressed by a rating ranging from 0 to 10. The greater the wet tearing strength, the higher the rating, with rating 0 corresponding to a paper having very poor wet tearing strength while rating 10 corresponds to a paper which has excellent wet tearing strength.

The measuring operation is carried out immediately after preparation of the coated paper, on the one hand on a sample which has not been dried in an oven, and on the other hand, on a sample which has been dried in an oven for 5 minutes at a temperature of 110° C.

Table 4 sets forth the nature and the proportion by weight of the solid constituents of the coating compositions corresponding to each of the Examples and to each of the comparative tests carried out using the latex of the corresponding copolymer A as the binding agent.

The coating compositions are adjusted to a pH-value of 8.5 by the addition of ammonia. They are adjusted by the addition of water so as to contain 60% by weight of dry materials.

TABLE 4

| | Comparative tests | Examples 1 to 11 |
|---|---|---|
| Kaolin | 100 | 100 |
| Sodium hexametaphosphate | 0.3 | 0.3 |
| Carboxymethylcellulose | 0.3 | 0.3 |
| Copolymer A latex | 12 | — |
| Interpolymer latex | — | 12 |

Tables 5, 6, 7 and 8 set forth the wet tearing strength values of the coated paper for each of the Examples and each of the corresponding comparative tests.

TABLE 5

| | Wet tearing strength | |
|---|---|---|
| | Undried sample | Dried sample |
| Comparative test | 7 | 9 |
| Example 1 | 9 | 9 |

TABLE 6

| | Wet tearing strength | |
|---|---|---|
| | Undried sample | Dried sample |
| Comparative test | 4 | 5 |
| Example 2 | 9 | 9 |

TABLE 7

| | Wet tearing strength | |
|---|---|---|
| | Undried sample | Dried sample |
| Comparative test | 3 | 5 |
| Example 3 | 4 | 5 |
| Example 4 | 6 | 7 |
| Example 5 | 7 | 8 |
| Example 6 | 7 | 9 |
| Example 7 | 5 | 9 |
| Example 8 | 6 | 9 |
| Example 9 | 5 | 10 |

TABLE 8

| | Wet tearing strength | |
|---|---|---|
| | Undried sample | Dried sample |
| Comparative test | 3 | 4 |
| Example 10 | 7 | 9 |
| Example 11 | 8 | 8 |

It will be seen that the aqueous compositions containing the interpolymer latexes according to the invention, as binding agents, result in a coated paper which has a better degree of wet tearing strength than paper which has been coated with aqueous compositions containing the latexes of the corresponding copolymers A as the binding agents.

Finally, a comparative test was carried out by means of an interpolymer which is not part of the invention and which comprises copolymer A of Examples 3 to 9 and the bis(ethyl)vinylphosphonate polymer. This interpolymer comprises 98% of copolymer A and 2% of bis(ethyl)vinylphosphonate polymer. It was prepared in accordance with the mode of operation described in the foregoing Examples. The only addition was 0.08 part of ammonium persulphate dissolved in 10 parts of deionised water, after the temperature of the reaction medium in the autoclave (containing the latex of copolymer A and the monomer bis(ethyl)vinylphosphonate) was raised to 75° C.

The proportion by weight of dry materials in the interpolymer latex was 40% and the proportion of interpolymer which is insoluble in isopropyl alcohol was 95.4%. The proportion by weight of bis(ethyl)vinylphosphonate present in the grafted state, in the part of the interpolymer which is insoluble in isopropyl alcohol, was 0.16%.

The interpolymer latex was then incorporated into the aqueous paper coating composition formula set forth in Table 4 above.

This aqueous composition was used to coat paper, followed by drying at a temperature of 120° C., calendering and conditioning at a temperature of 23° C. in an atmosphere containing 50% relative humidity.

The coated paper was then examined from the point of view of its wet tearing strength. Table 9 hereinafter sets forth the wet tearing strength values of the paper coated on the one hand by means of the aqueous composition containing the interpolymer of copolymer A (Examples 3 to 9) and the bis(ethyl)vinylphosphonate polymer and, on the other hand, and by way of indication, by means of the aqueous composition containing copolymer A alone.

TABLE 9

| | Undried sample | Dried sample |
|---|---|---|
| Aqueous composition containing copolymer A latex | 3 | 5 |
| Aqueous composition containing a latex of interpolymer of copolymer A and bis(ethyl)vinylphosphonate polymer | 2 | 3 |

It is found that the aqueous coating composition with the interpolymer containing bis(ethyl)vinylphosphonate polymer imparts even worse wet tearing strength to the coated paper, than that observed with an aqueous composition containing a latex of copolymer A alone.

I claim:

1. A latex of an interpolymer composed of a copolymer A comprising copolymerized butadiene, styrene and at least one ethylenically unsaturated carboxylic acid and a bis(2-chloroethyl)vinylphosphonate polymer B which is at least partly grafted onto copolymer A.

2. An interpolymer as claimed in claim 1 in which polymer B is bis(2-chloroethyl)vinylphosphonate polymer.

3. A latex as claimed in claim 1 in which the interpolymer comprises from 80 to 99% by weight of copolymer A and from 20 to 1% by weight of polymer B.

4. A latex as claimed in claim 1 in which copolymer A comprises, by weight, from 25 to 55% of butadiene, from 35 to 74% of styrene and from 1 to 10% of at least one ethylenic unsaturated carboxylic acid.

5. A latex as claimed in claim 1 in which polymer B comprises, by weight, from 15 to 100% of bis(2-chloroethyl)vinylphosphonate and from 0 to 85% of at least one ethylenic unsaturated compound copolymerizable with bis(2-chloroethyl)vinylphosphonate.

6. A latex as claimed in claim 1 in which at least 75% of the interpolymer is insoluble in isopropyl alcohol and comprises, in the grafted state, from 0.2 to 15% by weight of bis(2-chloroethyl)vinylphosphonate.

7. A latex as claimed in claim 1 in which the carboxylic acid is selected from the group consisting of acrylic acid, methacrylic acid, itatonic acid, maleic acid and fumaric acid.

8. A latex as claimed in claim 5 in which the compound which is copolymerizable with bis(2-chloroethyl)vinylphosphonate compounds is selected from the group consisting of vinylaromatic compounds, vinyl halides, vinylidene halides, dienic compounds, vinyl esters of carboxylic acid and acrylic compounds.

9. A latex as claimed in claim 5 in which the compound which is copolymerizable with bis(2-chloroethyl)vinylphosphonate is selected from the group consisting of styrene, α-methylstyrene, paratertiobutylstyrene, chlorostyrene, vinyltoluene, vinyl chloride, vinyl bromide, vinyl fluoride, vinylidene chloride, butadiene, isoprene, chloroprene, acrylic acid, methacrylic acid, acrylamide, methacrylamide, acrylic nitrile, methacrylic nitrile, chloroacrylonitrile, vinyl acetate, esters of acrylic acid and esters of methacrylic acid.

10. A latex as claimed in claim 5 in which the compound which is copolymerizable with bis(2-chloroethyl)vinylphosphonate is selected from the group consisting of methyl acrylate, ethyl acrylate, hydroxethyl acrylate, hydroxypropyl acrylate, n-butyl acrylate, isobutyl acrylate, methyl methacrylate, ethyl methacrylate, hydroxyethyl methacrylate, hydroxypropyl methacrylate, n-butyl methacrylate and isobutyl methacrylate.

11. A process for the preparation of latexes of claim 1, emulsion polymerizing butadiene, styrene and at least one copolymerizable ethylenic unsaturated carboxylic acid to produce a copolymer latex, and then polymerizing a vinyl phosphonate alone or in combination with at least one ethylenic unsaturated compound which is copolymerizable with the vinylphosphonate, in the presence of the copolymer latex.

12. A process as claimed in claim 11, in which the vinylphosphonate is bis(2-chloroethyl)vinylphosphonate.

13. Coated paper characterized by high wet strength comprising paper fibers bonded with the interpolymer of claim 1.

* * * * *